Patented May 24, 1949

2,471,010

UNITED STATES PATENT OFFICE 2,471,010

SEALING COMPOSITIONS CONTAINING CHLORINATED DIPHENYL AND GRAPHITE

Laurence L. Rector, Fort Worth, and Charles L. Cron, Houston, Tex.

No Drawing. Application February 26, 1948, Serial No. 11,328

10 Claims. (Cl. 260—37)

This invention relates to new and useful improvements in sealing compositions.

One object of the invention is to provide an improved composition for efficiently sealing the joints of conduits and containers against the leakage of gas or liquids under excessive temperature ranges and particularly between the temperatures of −67° F. and 212° F.

An important object of the invention is to provide an improved sealing composition which is non-combustible in the presence of oxygen so as to be particularly adaptable for use in sealing oxygen systems and thereby eliminate the hazards of fire and explosion normally incident to the confining of this gas.

Another object of the invention is to provide an improved sealing composition which contains no water, so as to withstand exposure to freezing temperatures during use and storage, which is non-corrosive to metals and/or alloys, and which has an extremely low evaporation rate so as to be non-drying with age and capable of being stored in open containers without evaporative loss.

A particular object of the invention is to provide an improved sealing composition having a smooth, relatively mobile consistency so as to be readily applicable to the abutting surfaces of joints, such as screw-threaded joints, the composition having exceptional adhering and lubricating qualities whereby it will not be swept off of threads to which it is applied when said threads are engaged by mating threads and whereby maximum engagement of said threads may be had without excessive torque and the threads may be disengaged with less torque.

A further object of the invention is to provide an improved sealing composition, of the character described, which will not dry out, so as to retain its elasticity and mobility to a marked degree whereby the disconnection of joints having the composition applied thereto is facilitated.

Still another object of the invention is to provide an improved sealing composition of the character described, which consists of chlorinated diphenyl admixed with a suitable quality of graphite in substantially equal proportions and which is in the form of a smooth, homogeneous paste so as to facilitate application of the same.

Yet another object of the invention is to provide an improved sealing composition of the character described which consists of chlorinated diphenyl and graphite, the graphite containing less than 15% ash, and preferably less than 10%, and less than 1% non-graphitic carbon, so that a sealing composition which has considerable lubricating values and which is non-combustible in the presence of oxygen gas at a pressure above atmospheric, is obtained.

The invention will be more readily understood from a reading of the following specification, wherein a specific example of the invention is set forth.

This application is a continuation-in-part of our co-pending application, Serial No. 540,155, filed June 13, 1944, now abandoned.

The improved composition preferably consists of a mixture, in substantially equal proportions by weight, of chlorinated diphenyl and a selected grade of graphite having lubricating qualities and a minimum absorption value. In producing the composition, the constituents are first weighed and are then thoroughly admixed in a suitable mechanical mixer, such as an ordinary dough mixer, the chlorinated diphenyl being placed in the mixer prior to the graphite. Admixture of the constituents is facilitated by maintaining the batch at a temperature of approximately 125° F. while the same is vigorously stirred or agitated. Under these conditions, the mixing may be completed in substantially 30 minutes time. It is pointed out that the graphite is easily wetted by the chlorinated diphenyl and that a smooth homogeneous paste is produced as a result of this simple mixing.

It is preferable that the chlorinated diphenyl consist essentially of pentachlordiphenyl, which contains approximately 54.4% or 54% to 55% chlorine, or be obtained by means of a commercial "cut," having substantially this chlorine content, from a homologous series of chlorinated diphenyls containing from 54% to 55% chlorine. As is well-known, chlorination of diphenyls may be accomplished progressively from monochlordiphenyl to decachlordiphenyl, depending on the number of hydrogen atoms which are replaced by chlorine atoms. Upon increasing the quantity of chlorine, the highly-mobile liquid becomes increasingly viscous until a crystalline solid is produced, as well as becoming decreasingly susceptible to combustion. Pentachlordiphenyl, the preferable synthetic resin vehicle, is a viscous liquid having substantially the mobility of processed linseed oil, possessing considerable lubricating qualities and being exceptionally adhesive to metals. As commercially produced, chlorinated diphenyls are a mixture of homologues and the different or individual homologues are seldom completely separated by the usual fractional distillation process. The commercial "cut," which contains 54% to 55% chlorine, is well suited to use in place of pentachlordiphenyl, although small quantities of homologues other than pentachlordiphenyl, such as tetrachlordiphenyl, hexachlordiphenyl and/or other diphenyls having more or less chlorine, may be embodied therein.

Depending upon the quantities of graphite employed and the physical characteristics of the graphite, the chlorinated diphenyl content of the composition may be varied from 45% to 55%. This diphenyl is preferably chlorinated to a point at which it contains 45% to 65% chlorine although better results are obtained in general when the chlorine is in the range of 52% to 58% of the weight of the chlorinated diphenyl. Of course, the preferred ingredient is the commercial cut equivalent to pentachlordiphenyl, which may be defined as containing 54 plus or minus 1% chlorine.

Graphite is employed as a filler and binder in this composition because of its exceptional lubricating properties and its resistance to oxidation. The lubricative properties are well-known and need not be discussed. However, it is not as generally known that graphite will not combust in a pure oxygen atmosphere at pressures near or above atmospheric pressure. This latter characteristic permits the use of graphite in this composition and thus makes available its excellent lubricating properties. In our prior application, referred to hereinabove, the use of various alternative fillers was disclosed. However, it has been found that fillers other than graphite do not have the necessary ability to lubricate and to fill small pits and depressions in the connections being sealed. Hence, the application is now limited to selected graphite of the quality described.

Amorphous graphite is used in producing this composition, and the graphite is carefully selected so as to have a minimum ash content and a minimum quantity of nongraphitic carbon, which is readily affected by oxygen, whereby the same will be substantially free from abrasive material and will have the desired lubricating and oxygen resisting qualities. Satisfactory compounds have been made with graphite containing as much as 15% ash, but it is preferred to have this component 10% or less. The mineral matter composing the ash of course affects the lubricating quality of the compound, and affects it adversely to a greater degree if the ash is siliceous and in the form of sharp particles. The lubricating quality is affected to a lesser degree if the ash is composed of mineral oxides that are soft and flaky. For this reason, the allowable range of ash content in the graphite may be stated 10% to 15%, but it is to be noted that this represents the maximum value, and that it is preferable to have the ash content as near zero as practicably possible.

Although graphite is composed of almost pure carbon, it is not combustible in the presence of pure oxygen under pressure above atmospheric. However, all commercial graphite contains lesser or greater amounts of non-graphitic carbon, and this component is extremely objectionable in that it has no lubricating value and is quite combustible in the presence of pure or substantially pure oxygen. It is therefore necessary that the non-graphitic carbon content of the graphite be kept near or below 1% of the weight of the graphite. Of course, it is again desirable to maintain the percentage of this undesirable component as low as possible and as near zero as possible.

It is desirable that the graphite be exceptionally fine or finely divided so as to be capable of filling minute depressions, such as pits or crevices, which occur in metallic surfaces. Also, it is essential that the graphite have a definite maximum absorption value, preferably not in excess of 30 grams of liquid per 100 grams of graphite.

Manifestly, natural graphites vary slightly in physical properties, depending upon their source of derivation, the method and fineness of grinding the same, as well as their chemical composition. Therefore, a commercial graphites have varying or different absorption values, and as a result it is necessary to deviate slightly from the desirable equal proportions hereinbefore set forth. These proportions are altered so as to produce a composition having a definite plasticity or mobility. It has been found that the best spreading characteristics are obtained when the completed composition has a penetration value of 250 to 350 at 77° F. upon being tested in accordance with the American Society for Testing Material method D217-38T or Federal Specification VV-L 791b method 31.12. Although a composition with this penetration value has been found to be most desirable and useful, specific uses might permit or necessitate varying values of penetration without impairing the other desirable properties of the composition.

As has been hereinbefore pointed out, the chlorinated diphenyl and graphite are preferably employed in equal proportions by weight. However, these proportions may vary from 45%–55% to 55%–45%, depending upon the quantity of chlorine and the characteristics of the graphite. Within the scope of the foregoing proportions of the constituents, the improved sealing composition takes the form of a smooth, homogeneous paste, which is easily spread, which has a marked adherence for and is non-corrosive to metals and/or alloys, which has a low evaporation rate and which possesses exceptional lubricating qualities.

In use, the composition may be readily applied to the abutting surfaces of joints, such as screw-threaded pipe joints, couplings and other connections employed in conduits. Due to its inherent plasticity or mobility as well as its adhering and lubricating qualities, the composition is particularly adaptable to the sealing of threaded joints and may be applied to the external threads only without danger of being swept off the internal or mating threads. Also, maximum engagement of the threads is obtainable with minimum torque and there is less torque when said threads are disengaged. In addition, the composition will effectively seal against the leakage of liquid or gas under pressure up to 2,000 lbs. per square inch and at temperatures ranging from −67° F. to at least 212° F. and possibly higher. The ability of the composition to withstand these excessive temperatures is due to the lack of water content and its low evaporation rate, whereby the same retains its plasticity or mobility during use in storage. It is noted that the composition is non-combustible or will not support combustion, in the presence of oxygen and, therefore, is particularly useful and advantageous in the sealing of oxygen systems. By employing this composition to seal the joints of such a system, leaks are positively prevented and the usual hazards of fires and explosions are virtually eliminated. Due to the characteristics of the composition which permit the making up and disconnection of threaded joints with minimum torque, very little frictional heat is generated and consequent damage to the threads of said joint is prevented. Of course, this is especially desirable in connection with oxygen systems. Since the composition retains its plasticity or mobility, severe and prolonged vibration have substantially no effect upon joints sealed by the same.

Following are specific examples of the composition:

Example I

| | Per cent |
|---|---|
| Chlorinated diphenyl (chlorine content 45%–65%) | 45–55 |
| Graphite, containing less than 15% ash and less than 1% non-graphitic carbon | 55–45 |

Example II

| | Per cent |
|---|---|
| Chlorinated diphenyl (chlorine content 52%–58%) | 45–55 |
| Graphite, containing less than 10% ash and less than 1% non-graphitic carbon, with a maximum absorption value of 30 grams of liquid per 100 grams graphite | 55–45 |

Example III

Substantially equal parts of chlorinated diphenyl containing 54 plus or minus 1% chlorine, and graphite having less than 10% ash content and less than 1% non-graphitic content, and having a maximum absorption value of 30 grams of liquid per 100 grams of graphite, the chlorinated diphenyl and graphite being thoroughly admixed into a composition having a penetration value of 250 to 350 at 77° F. upon being tested in accordance with the American Society for Testing Material method D217–38T.

From the foregoing, it is manifest that an efficient sealing composition has been provided. The preferable constituents are a carefully selected amorphous graphite and a chlorinated diphenyl containing 54.4% or 54% to 55% chlorine (pentachlordiphenyl), in substantially equal portions by weight, said constituents as well as their proportions being subject to slight variations. As has been pointed out, natural and/or commercial graphites lack a constant absorption value, and therefore penetration tests are employed to obtain a composition having the desired plasticity and/or mobility. The chlorine content of the chlorinated diphenyl may vary from 45% to 65% and this constituent may form 45% to 55% of the finished composition, the balance being made up by the graphite selected as previously described.

What we claim and desire to secure by Letters Patent is:

1. A sealing composition including, 45% to 55% chlorinated diphenyl containing 45% to 65% chlorine, and 55% to 45% amorphous graphite.

2. A sealing composition including, 45% to 55% chlorinated diphenyl containing 45% to 65% chlorine, and 55% to 45% amorphous graphite having a maximum ash content of 15%.

3. A sealing composition including, 45% to 55% chlorinated diphenyl containing 45% to 65% chlorine, and 55% to 45% amorphous graphite having a maximum ash content of 10%.

4. A sealing composition including, 45% to 55% chlorinated diphenyl containing 45% to 65% chlorine, and 55% to 45% amorphous graphite having a maximum non-graphitic carbon content of 1%.

5. A sealing composition including, 45% to 55% chlorinated diphenyl containing 52%–58% chlorine, and 55% to 45% amorphous graphite.

6. A sealing composition including, 45% to 55% chlorinated diphenyl containing 54 plus or minus 1% chlorine, and 55% to 45% amorphous graphite.

7. A sealing composition including, 45% to 55% chlorinated diphenyl containing 54 plus or minus 1% chlorine, and 55% to 45% amorphous graphite having a maximum ash content of 10%.

8. A sealing composition including, 45% to 55% chlorinated diphenyl containing 54 plus or minus 1% chlorine, and 55% to 45% amorphous graphite having a maximum non-graphitic carbon content of 1%.

9. A sealing composition consisting of, 45% to 55% chlorinated diphenyl containing 50% to 60% chlorine, and 55% to 45% amorphous graphite having a maximum non-graphitic carbon content of 1%.

10. A sealing composition consisting of substantially equal parts of chlorinated diphenyl containing 54 plus or minus 1% chlorine, and amorphous graphite having a maximum ash content of 10% and a maximum non-graphitic carbon content of 1%.

LAURENCE L. RECTOR.
CHARLES L. CRON.

REFERENCES CITED

The following references are of record in the file of this patent:

UNITED STATES PATENTS

| Number | Name | Date |
|---|---|---|
| 1,972,448 | Jenkins | Sept. 4, 1934 |
| 2,326,233 | Leatherman | Aug. 10, 1943 |
| 2,391,686 | McLean | Dec. 25, 1945 |